INVENTOR
Rudolf Maier

Nov. 2, 1965 R. MAIER 3,215,130
MULTIPART OIL COOLED INTERNAL COMBUSTION ENGINE PISTON
Filed June 10, 1964 2 Sheets-Sheet 2

INVENTOR
Rudolf Maier

BY Bailey, Stephens and Huettig
ATTORNEYS

3,215,130
MULTIPART OIL COOLED INTERNAL COMBUSTION ENGINE PISTON
Rudolf Maier, Stuttgart-Weilimdorf, Germany, assignor to Mahle Komm.-Ges., Stuttgart-Bad Cannstatt, Germany
Filed June 10, 1964, Ser. No. 373,965
Claims priority, application Germany, Aug. 30, 1963, M 58,018
2 Claims. (Cl. 123—41.35)

This invention relates to a piston for an internal combustion engine and, in particular, to a multipart piston composed of a piston head secured to a piston body and means for cooling the piston head and body by oil under pressure.

In a piston of this type, the piston head is removably secured to the piston body by bolts extending into blind bores in the piston body and corresponding holes in the piston head which are closed by nuts engaging the bolts. Cooling oil passageways are formed between the piston head and the piston body.

In this invention, such pistons are provided with substantially circular chambers around the shanks of the bolts and/or screws, and these chambers are connected with the cooling oil passageways in such a way that each hollow chamber is provided with a cooling oil inlet opening and a cooling oil outlet opening so that the cooling oil necessarily flows through each chamber.

By this means, the bolts and/or screws are intensively cooled as well as the adjacent connected surfaces. This reduces to a minimum the stresses which are produced by the thermal expansion produced by the heating of the piston head and body and the connecting bolts and/or screws. Therefore, short bolts which are easy to install can be used instead of the customary long necked-down bolts.

In addition, the cooling is improved in that the chambers surrounding the bolt shanks are always filled with oil so that, when the oil supply is temporarily stopped or when the oil has not begun to flow during the starting of the engine, this stored oil produces a heat transfer from the hot piston head in which the bolts and/or screws are secured and the cooler piston body.

In order to achieve a uniform cooling, it is preferred that the chambers be connected to an annular oil passageway with an oil entrance and an oil exit opening alternately arranged with respect to each chamber.

The means by which the objects of the invention are obtained are described more fully with reference to the accompanying drawings in which.

Figure 1:
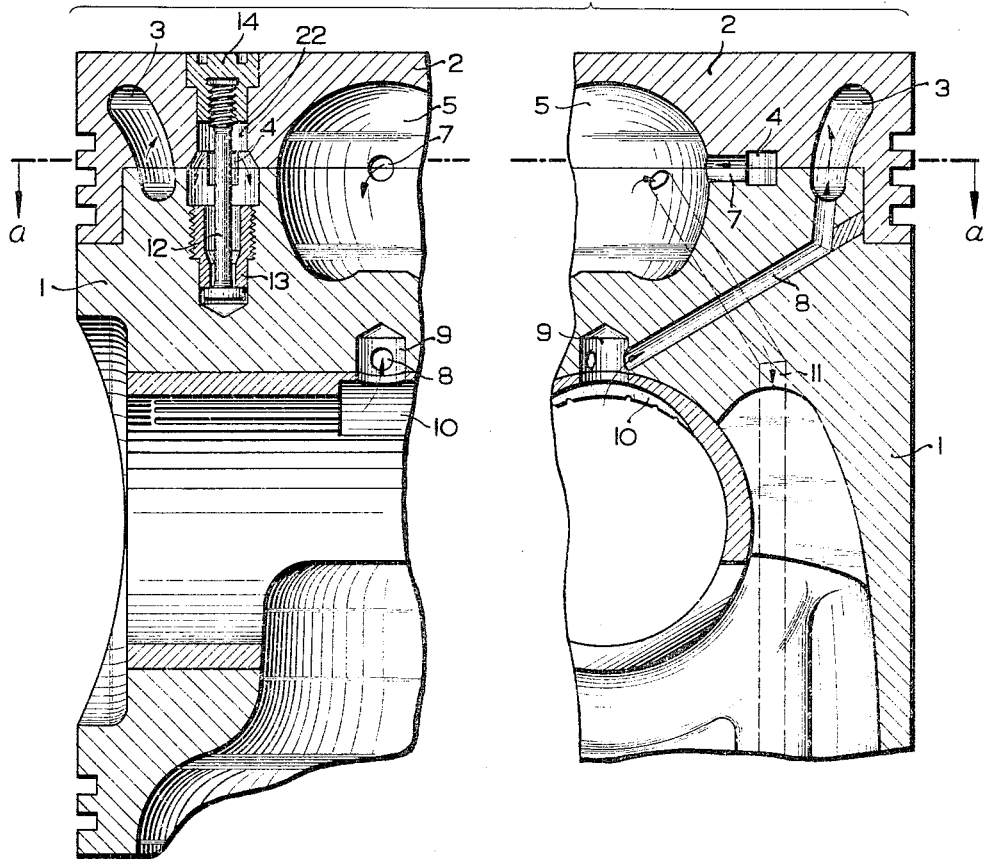
FIGURE 1 is a longitudinal cross-sectional view through a piston with this invention, the left side of the figure being a cross-section through a bolt and the right side of the figure being a cross-section through the connecting oil passageways.
Figure 2:
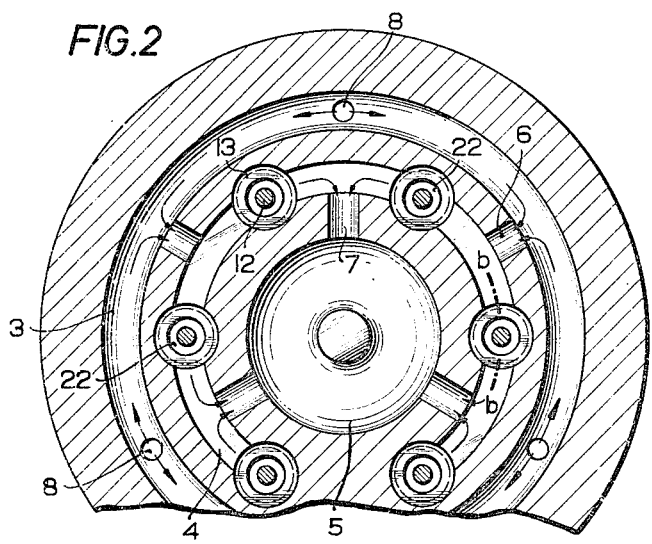
FIGURE 2 is a cross-sectional view taken on the line a—a of FIGURE 1.

As shown in FIGURES 1 and 2, the piston body 1 is joined to a piston head 2. Between the body and head are two annular oil passageways 3 and 4 and a central hollow space 5, these passageways and hollow space being connected by radially extending passageways 6 and 7.

Three oil supply lines 8 communicate with the outermost oil passageway 3 and come from a bore 9 which communicates with a recess 10 in the wrist pin bearing. Oil under pressure is supplied to the recess 10 according to common practice by means of a bore in the connecting rod of the piston which is not shown. An oil return passageway 11 branches off from the hollow space 5. The oil under pressure flows through the passageways in the directions indicated by the arrows.

Bolts and/or screws are used for connecting the piston head 2 to the piston body 1. In FIGURES 1 and 2, necked-down bolts 12 are used, which bolts have their lower bolt heads held by a thrust sleeve 13 inserted in the blind bores in the piston body. The threaded ends of bolts 12 extend into piston head 2 and are secured by nuts 14 which seal off the bolt holes in the piston head.

Figure 3:
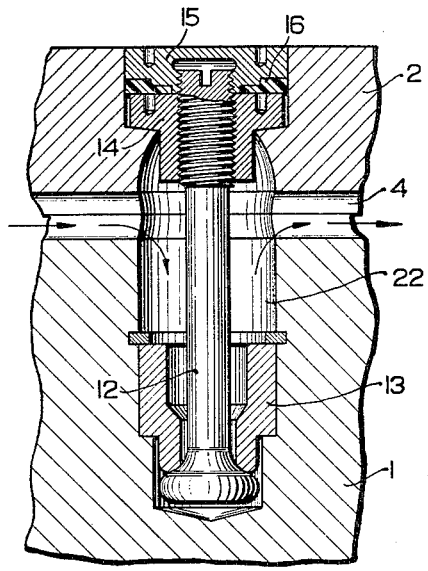
FIGURE 3 is a partial cross-sectional view taken on the line b—b of FIGURE 2 showing a modified form of bolt assembly.

In the modification of FIGURE 3, the bolt hole in the piston head is closed and sealed by a plug 15 and seal 16.

Figure 4:
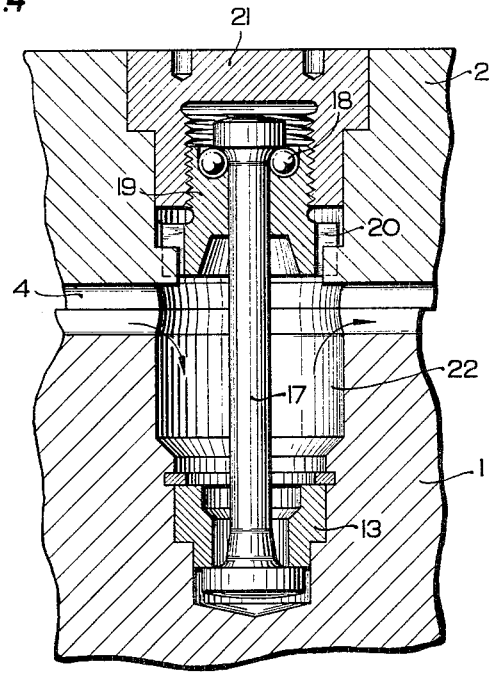
FIGURE 4 is a view similar to FIGURE 3 of another modified bolt assembly.

In the modification of FIGURE 4, a double-headed bolt 17 is used instead of a threaded bolt. The upper bolt head is held by balls 18 in the socket 19. This socket is vertically movable in the cylinder head but is prevented from turning by the splines 20 extending between the socket and the piston head. Socket 19 is exteriorly threaded, with the threads being engaged by the nut 21. This nut 21, together with the socket 19, forms a means for tensioning the bolt 17 so that the piston head 2 is drawn into tight engagement with the piston body 1.

In this invention, the shank of each bolt is surrounded by a chamber 22. These chambers are joined to a common annular passageway 4 so that each chamber has a cooling oil inlet and a cooling oil outlet. The oil inlet passageway 6 lies between the annular passageways 3 and 4. The oil outlet passageway 7 lies between the passageway 4 and the hollow space 5. The passageways 6 and 7 are on opposite sides of each chamber 22 and thus are alternately arranged around the passageway 4. Consequently, there is constant flow of cooling oil through chambers 22 and the shanks of the bolts are constantly cooled along substantially their entire length by the oil.

Having now described the means by which the objects of the invention are obtained,

I claim:

1. In an internal combustion engine piston having a piston head removably secured to a piston body by bolts, each having a shank extending from within the piston head into a blind bore in the piston body, nut means for securing the bolt in the piston head, and means for cooling the piston with oil under pressure, the improvement in which the cooling means includes a substantially circular chamber around the shank of the bolt, and cooling oil inlet and outlet openings in said chamber.

2. In a piston as in claim 1, further comprising an annular oil passageway common to the chambers, and oil entrance and exit openings alternately arranged with respect to the chambers.

References Cited by the Examiner

UNITED STATES PATENTS

| | | | |
|---|---|---|---|
| 1,226,631 | 5/17 | Bie | 123—41.35 |
| 2,759,461 | 8/56 | Maybach | 123—41.35 |

KARL J. ALBRECHT, *Primary Examiner.*